US006731121B1

(12) United States Patent
Hsu et al.

(10) Patent No.: US 6,731,121 B1
(45) Date of Patent: May 4, 2004

(54) HIGHLY CONFIGURABLE CAPACITIVE TRANSDUCER INTERFACE CIRCUIT

(75) Inventors: Ying Hsu, Huntington Beach, CA (US); Christ Saunders, Laguna Niguel, CA (US); Kirk Su, Irvine, CA (US)

(73) Assignee: Microsensors Corp., Costa Mesa, CA (US)

(*) Notice: Subject to any disclaimer, the term of this patent is extended or adjusted under 35 U.S.C. 154(b) by 0 days.

(21) Appl. No.: 10/110,889

(22) PCT Filed: Oct. 16, 2000

(86) PCT No.: PCT/US00/41207

§ 371 (c)(1),
(2), (4) Date: Aug. 19, 2002

(87) PCT Pub. No.: WO01/31351

PCT Pub. Date: May 3, 2001

Related U.S. Application Data

(60) Provisional application No. 60/159,832, filed on Oct. 15, 1999.

(51) Int. Cl.[7] .............................................. G01R 27/26
(52) U.S. Cl. ................................................... 324/678
(58) Field of Search ................................ 324/658, 660, 324/661, 676, 678, 672, 669, 684, 686, 690, 662; 340/870.37

(56) References Cited

U.S. PATENT DOCUMENTS

| 5,028,876 A | 7/1991 | Cadwell | 324/678 |
| 5,451,940 A | 9/1995 | Schneider et al. | 340/870.37 |
| 5,659,195 A | 8/1997 | Kaiser et al. | 257/415 |
| 5,777,482 A | 7/1998 | Tielert et al. | 324/678 |

Primary Examiner—Albert Decady
Assistant Examiner—James Kerveros
(74) Attorney, Agent, or Firm—Myers Dawes Andras & Sherman LLP; Joseph C. Andras

(57) ABSTRACT

A transducer interface circuit (10) for use with a capacitive sensor (20). The interface circuit (10), provided on application specific IC, includes numerous trims and adjustments that permit it to operate with a differential, balanced-pair sensors (20A) or a singled-ended sensor (2013). In particular, the circuit (10) provides a capacitive adjustment section (100) and a capacitive trans-impedance amplifier section (200) that are configured with capacitor adjustment controls (110) and gain adjustment controls (210) that, along with other controls, are provided as control registers. The capacitive trans-impedance amplifier section (300) periodically reverses the voltages across the sensor (20), and the capacitive adjustment section (200), after blanking a feedback capacitance (CF) that is used to integrate excess charge caused by a difference in capacitance. A low pass filter section 300 provides bandwidth adjustment without requiring any external components. An output buffer section (400) includes further trim controls for gain and offset, is also governed by an offset selection bit SOFF that adjusts the output range to be optimally suited for the balanced-pair sensors (20A) or a singled-ended sensor (20B).

12 Claims, 10 Drawing Sheets

A DIFFERENTIAL SENSOR HAVING A BALANCED-PAIR OF CAPACITORS

A SINGLE-ENDED SENSOR HAVING ONLY ONE CAPACITOR

Capacitor Array Circuit CS1_INT – 9 bits - Binary Weighted in 19pF steps

| CS1_8 | CS1_7 | CS1_6 | CS1_5 | CS1_4 | CS1_3 | CS1_2 | CS1_1 | CS1_0 | Cap (pF) |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 1 | 0.019 |
| 0 | 0 | 0 | 0 | 0 | 0 | 0 | 1 | 0 | 0.038 |
| : | : | : | : | : | : | : | : | : | : |
| 1 | 0 | 0 | 0 | 0 | 0 | 0 | 0 | 0 | 4.864 |
| : | : | : | : | : | : | : | : | : | : |
| 1 | 1 | 1 | 1 | 1 | 1 | 1 | 1 | 1 | 9.709 |

FIG. 7

Capacitor Array Circuit CS2_INT – 6 bits - Binary Weighted in 19pF steps

| CS2_5 | CS2_4 | CS2_3 | CS2_2 | CS2_1 | CS2_0 | Cap (pF) |
|---|---|---|---|---|---|---|
| 0 | 0 | 0 | 0 | 0 | 0 | 0 |
| 0 | 0 | 0 | 0 | 0 | 1 | 0.019 |
| 0 | 0 | 0 | 0 | 1 | 0 | 0.038 |
| : | : | : | : | : | : | : |
| 1 | 0 | 0 | 0 | 0 | 0 | 0.608 |
| : | : | : | : | : | : | : |
| 1 | 1 | 1 | 1 | 1 | 1 | 1.197 |

HIGHLY CONFIGURABLE CAPACITIVE TRANSDUCER INTERFACE CIRCUIT

This application claims the priority of provisional application 60/159,832 filed on Oct. 15, 1999.

BACKGROUND OF THE INVENTION

1. Field of the Invention

This invention relates generally to transducer interface circuits that detect a change in capacitance as a measure of change in a targeted physical quantity and, more particularly, to a highly configurable capacitive transducer interface circuit that is programmable to accommodate a differential or single-ended sensor, to provide a desired gain and offset, and to provide a desired bandwidth.

2. Description of the Related Art

A number of patents have been issued to other circuit arrangements for measuring capacitance. The prior art, however, has focused on increasing the sensitivity of circuits by employing techniques to compensate for effects of parasitic capacitance, and to reduce the influence of scaling factors. A patent awarded to Reinhard, et al, "Circuit Arrangement and Method For Measuring a Difference In Capacitance Between a First Capacitance C1 and a Second Capacitance C2" (U.S. Pat. No. 5,777,482), uses evaluation logic to isolate the unwanted parasitic capacitance. A patent awarded to W. J. Kaiser, et al., "CMOS Integrated Microsensor With A Precision Measurement Circuit" (U.S. Pat. No. 5,659,195), integrated the transducers with CMOS circuits to eliminate the parasitic capacitance. The invention by G. Schneider, "Capacitive Sensor signal Processing Arrangement Using Switch Capacitor Structures" (U.S. Pat. No. 5,451,940), switched the two inputs of operational amplifier to remove the charges due to connection with external electric effects, hence allowing connection of a reference capacitor to any desired potential. In the patent "Precision Capacitve Transducer Circuit and Methods" (U.S. Pat. No. 5,028,876) the proposed arrangement of circuits used switching techniques and common measurements to extract the ratio of the difference and sum of capacitance to remove the effects of parasitic capacitance, magnitude of the transducer capacitance, and scaling factors.

A significant disadvantage with the foregoing circuits is that they can only be optimized for a relatively small range of input parameters. Each circuit must be individually "tuned" to eliminate parasitic capacitance, and changed for different connections. Each type of transducer requires its own electronics, and "universal" signal processing circuit is not possible. Second, the prior art does not address the ability of a single circuit to measure both absolute changes (single-end) and relative changes (differential). Third, the prior art does not address the need to accommodate different bandwidth requirements. Fourth, the prior art does not address the manufacturing of the integrated circuits wherein processing tolerances often result in variations of on-chip resistors and capacitors which alters the circuit sensitivity. There remains a need, therefore, for a capacitance measurement circuit that accommodates wide differences in connectivity, bandwidths, and capacitance magnitudes.

SUMMARY OF THE INVENTION

In a first aspect, the invention may be regarded as a capacitive transducer interface circuit that produces an output value that is proportional to a change in capacitance of a sense capacitor in a capacitive transducer comprising: an integrated circuit having: (1) a capacitive adjustment section that is electrically connected to the sense capacitor, including: (a) a capacitor array circuit; (b) means for configuring the capacitance of the capacitor array circuit such that the sense capacitor and capacitive adjustment section combine to provide a substantially null value when the capacitive transducer is in a null state; and (2) a capacitive trans-impedance amplifier section that is electrically connected to the sense capacitor and the capacitive adjustment section, including: (a) a trans-impedance amplifier means for producing an output signal that is proportional to the change in capacitance of the sense capacitor; and (b) means for configuring the gain of the capacitive trans-impedance amplifier to provide a desired dynamic range.

In a second aspect, the invention may be regarded as a capacitive transducer interface circuit that produces an output value that is proportional to a difference in capacitance between first and second capacitors that are connected together at a common terminal, comprising: (a) a trans-impedance amplifier means for producing an output signal that is proportional to the difference in capacitance between the first and second capacitors, said trans-impedance amplifier means including an operational amplifier having an inverting input, a non-inverting input, and an output, with the inverting input connected to the common terminal, with the non-inverting input connected to a reference ground, and with a feedback capacitance connected between the output and the non-inverting input; (b) a means for repeatedly (1) discharging the feedback capacitance, (2) applying a voltage difference across the first capacitors to charge the first capacitor while applying an equal potential voltage across the second capacitor to discharge the second capacitor; and (3) then reversing the voltages applied to the first and second capacitors such that the first capacitor discharges into the second capacitor and integrates into or out of the feedback capacitance to the extent there is any difference in capacitance between the first and second capacitors.

BRIEF DESCRIPTION OF THE DRAWINGS

The just summarized invention may be best understood with reference to the following drawings of which:

FIGS. 7 and 8 are abridged versions of the truth tables for the preferred capacitor circuit arrays of FIG. 6;

DETAILED DESCRIPTION OF THE PREFERRED EMBODIMENTS

Various types of transducers, or sensors, are used to transform a physical variation into an electric signal or electrically detectable value.

The preferred transducer interface circuit 10, however, is specifically designed to interface with a capacitive-type transducer 20 where the physical variation is transferred to a moveable plate that is located adjacent to a fixed plate. As such, the invention is best understood with initial reference to such sensors.

Figure 1:
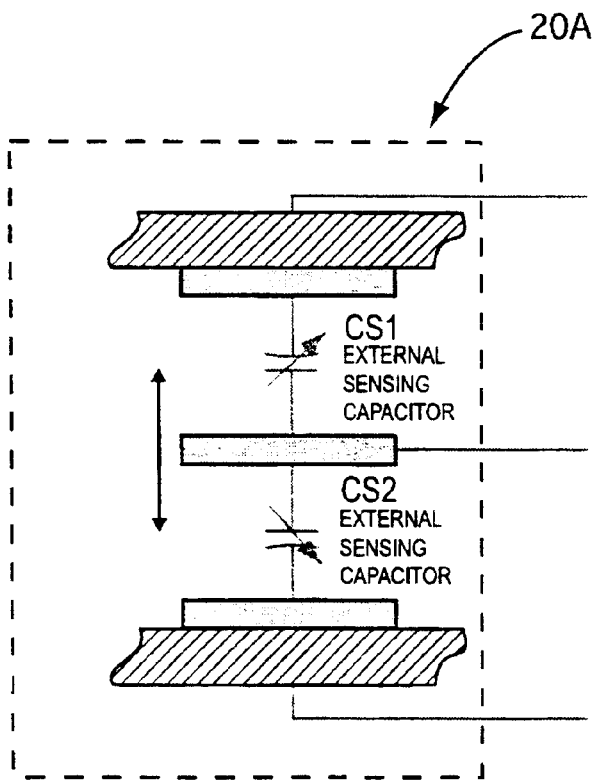
FIG. 1 is a schematic representation of a known-type differential sensor that has a balanced pair of capacitors that vary in opposition to one another in response to an external stimulus.
Figure 2:
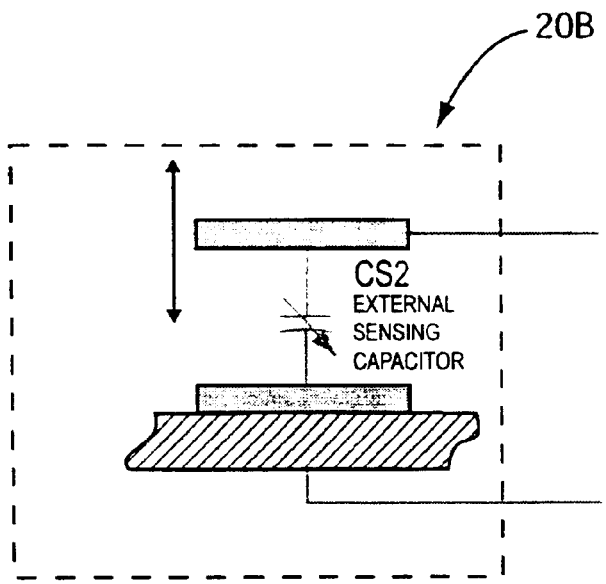
FIG. 2 is a schematic representation of a known-type single-ended sensor that has a single capacitor that varies in value in response to an external stimulus.

FIGS. 1 and 2 are simplified schematic representations of capacitive sensors 20A, 20B that are three-terminal and two-terminal devices, respectively. FIG. 1 shows a differential sensor 20A having a balanced pair of capacitors CS1, CS2 that share a common plate so that they mechanically vary in opposition to one another in response to an external stimulus (signified by the vertical arrow). The two outer elements may instead move relative to a fixed common plate, but the principle of operation remains the same. The differential sensor 20A of FIG. 1 is "balanced" in that the sense capacitor CS1 and CS2 should have equal values in the absence of stimulus. The sense capacitors CS1, CS2 are often not equal, however, due to manufacturing tolerances, mechanical biases, and other effects, such that an capacitive offset exists even in the absence of stimulus. FIG. 2 shows a single-ended sensor 20B that has only one capacitor CS2 that varies in value in response to an external stimulus.

It is usually necessary to use one type of transducer interface circuit with a differential sensor 20A and another type of transducer interface circuit with a single-ended sensor 20B. A transducer interface circuit 10 according to this invention, however, may be readily configured for use with either type of sensor as explained further below.

Capacitive sensors are used in various applications, including pressure sensors, accelerometers, gyros, and so on. Capacitive sensors are often used in Micro Electro-Mechanical Systems (MEMS) where the sensor's nominal capacitance is very small (e.g. picofarads). It is usually difficult to use one transducer interface circuit with multiple makes of transducers because of the variation in capacitance under stimulation will vary greatly from transducer to transducer. In other words, it is usually necessary to customize the interface circuit during the design phase, or by using large external components, to provide a dynamic range and resolution that is appropriate for a particular sensor.

Figure 3:
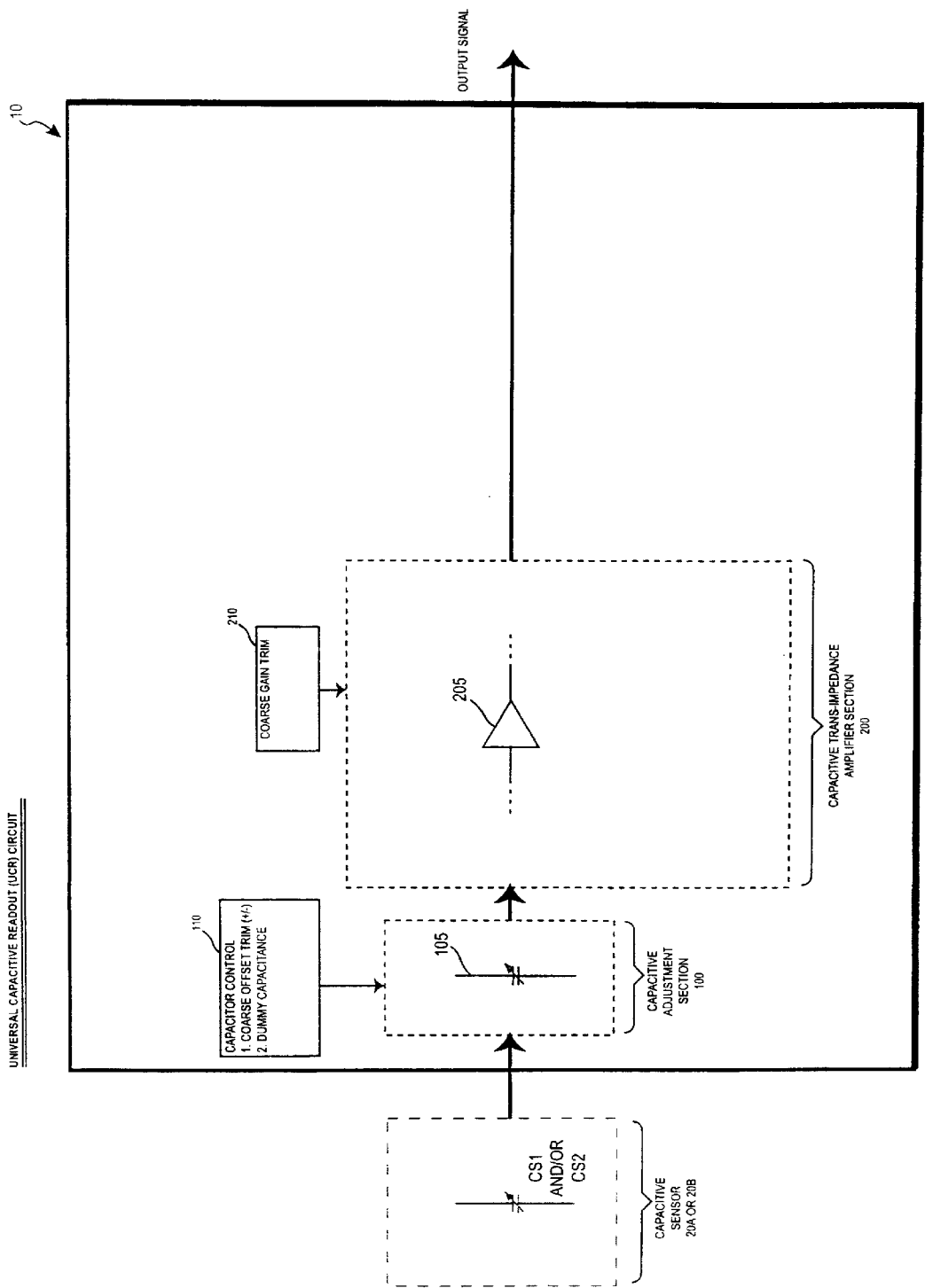
FIG. 3 is a schematic block diagram of a first preferred transducer interface circuit 10 with certain details shown, including a capacitive adjustment section 100 and a capacitive trans-impedance amplifier section 200.

FIG. 3 is a schematic block diagram of a first preferred transducer interface circuit 10 with certain details shown, including a capacitive adjustment section 100 and a capacitive trans-impedance amplifier section 200. As shown, the transducer interface circuit 10 is provided as an application specific integrated circuit that interface with a capacitive sensor 20A or 20B and produces an output signal that is proportional to changes in capacitances within the sensor. The output signal in the preferred sensor 10 is a voltage that is likely to be provided to an external A/D converter. The transducer interface circuit itself, however, could include built-in A/D functionality such that the output signal is provided in digital form.

In operation, the capacitive adjustment section 100 uniquely interfaces with a balanced pair sensor 20A or a single-ended sensor 20B. The capacitive adjustment section 100 is electrically connected to a sense capacitor (e.g. CS1 and/or CS2) in the capacitive sensor 20A, 20B. The capacitive adjustment section 100 includes a capacitor array circuit 105 (shown symbolically by the variable capacitor icon) and means 110 for configuring the capacitance of the capacitor array circuit such that the sense capacitor 20A, 20B and the capacitive adjustment section 100 combined to provide a substantially null value when the capacitive transducer 20A, 20B is in a null state.

When the transducer interface circuit 10 is used with a differential sensor 20A, the capacitor array circuit 105 is in parallel with one of the sense capacitors CS1, CS2, and the preferred adjustment means 110 varies the capacitor array circuit 105 in order to provide coarse offset trim (i.e. to make sure that the sensor 20A and the capacitive adjustment section 100 have a null value when the sensor is in a null position). When the transducer interface circuit 10 is used with a singled-ended sensor 20B, the capacitor array circuit 105 is connected in series with the sense capacitor CS2 to serve as a dummy capacitor that makes the two capacitors electrically equivalent to a differential sensor, and the preferred adjustment means 110 varies the capacitor array circuit 105 in order to vary the dummy capacitance such that the sensor 20B and the capacitive adjustment section 100 have a null value when the sensor is in a null position. The preferred adjustment means 110 is explained more fully below.

The CTIA 200 is electrically connected to the sense capacitor and to the capacitive adjustment section 100 in order to transform any variation in their collective impedance into the output signal. In other words, the CTIA 200 includes an amplifier means 205 for producing an output signal that is proportional to the change in capacitance of the sense capacitor CS1, CS2. The CTIA 200 is coupled to a means 210 for configuring the gain of the CTIA in order to provide a desired dynamic range, or range of operation.

Figure 4:
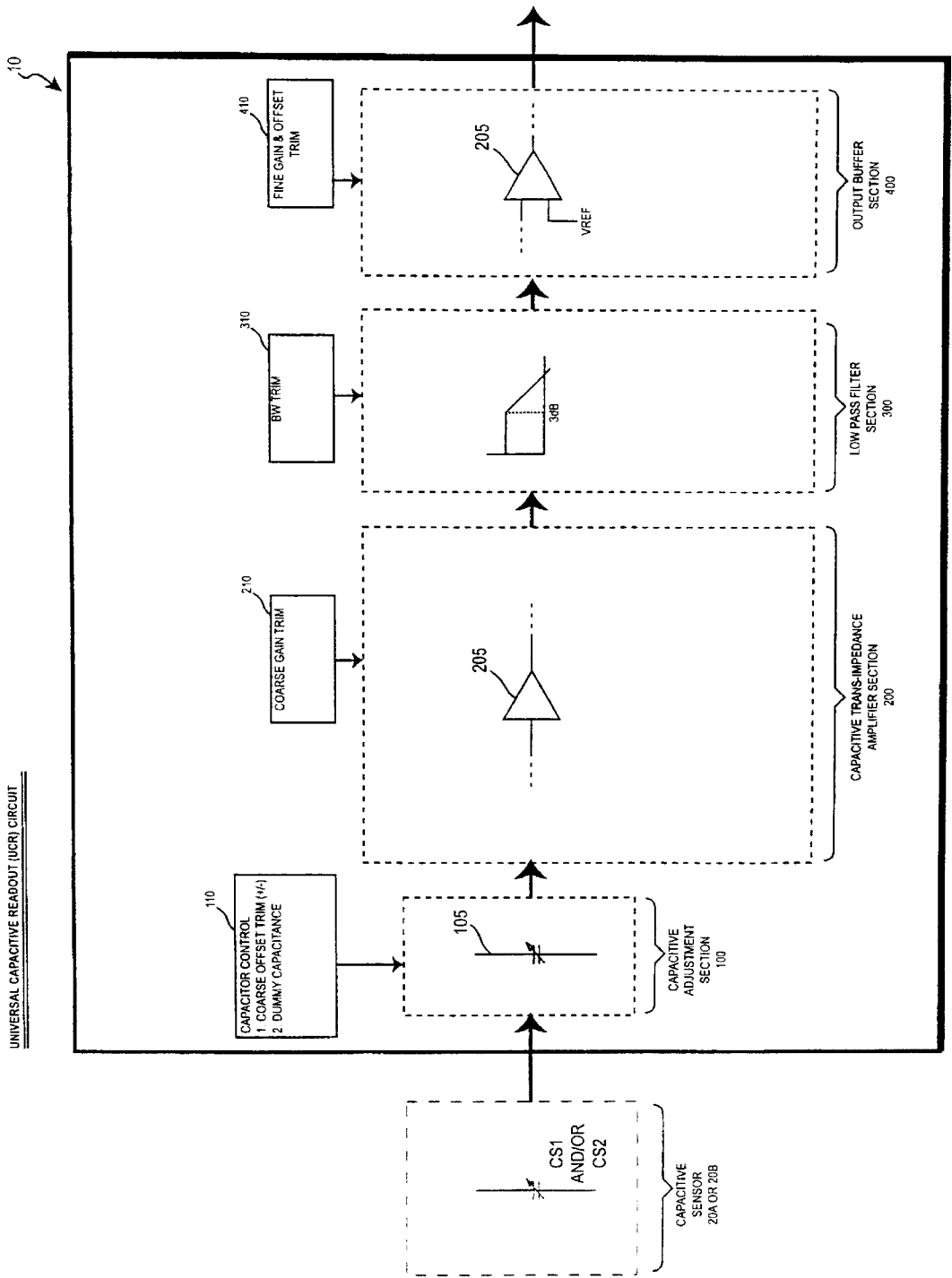
FIG. 4 is a schematic block diagram of the first preferred transducer interface circuit 10 with further details shown, including a low pass filter section 300 and an output buffer section 400.

FIG. 4 is a schematic block diagram of the first preferred transducer interface circuit 10 with further preferred details shown, including a low pass filter section 300 and an output buffer section 400. As shown, the low pass filter section 300 cooperates with a means 310 for configuring its characteristic bandwidth. The output buffer section 400 includes an amplifier circuit 405 that provides additional gain and a desired DC offset that is set with a reference voltage VREF, and it cooperates with a means 410 for configuring the additional gain and desired DC offset. The details of FIG. 4 have been illustrated separately from those of FIG. 3 because the latter are considered relatively essential.

Figure 5:
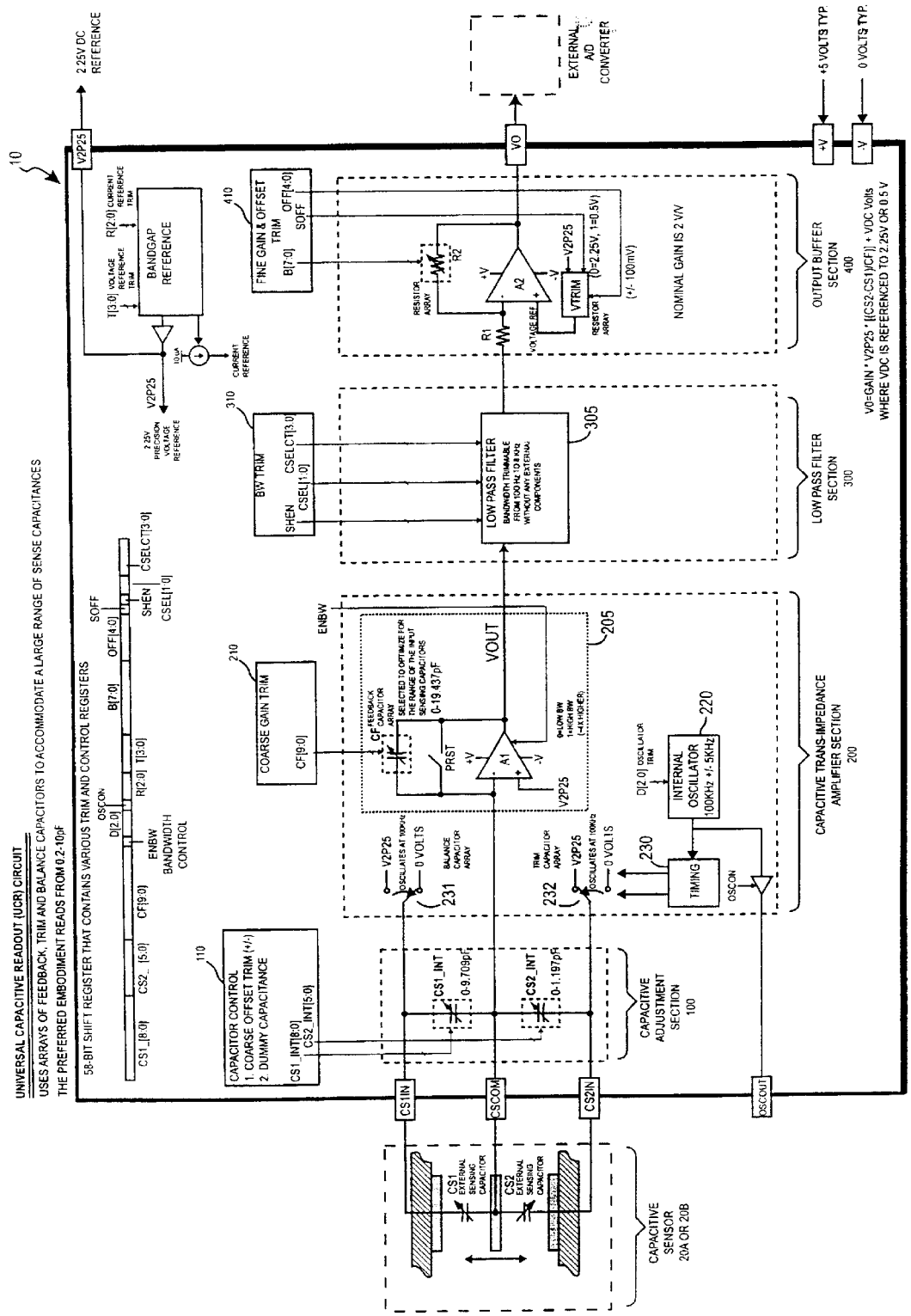
FIG. 5 is a schematic block diagram of the first preferred transducer interface circuit 10 of FIG. 4 with further details shown.

FIG. 5 is a schematic block diagram of the first preferred transducer interface circuit 10 with even further details shown. In particular, the internal circuit details of the functional blocks 100, 200, 300, 400 are now illustrated and will be explained.

Capacitive Adjustment Section 100

The capacitive adjustment section 100 interfaces with three leads CS1IN, CSCOM, CS2IN and includes first and second capacitor array circuits CS1_INT and CS2_INT that are electrically disposed between the three leads. The capacitor array circuits uniquely allow for large missmatches in capacitor sensor values such that the circuit 10 accommodates a wide range in manufacturability.

If the transducer interface circuit 10 is connected to a balanced-pair sensor 20A (as actually shown), then one or the other of the first and second capacitor array circuits CS1_INT and CS2_INT will be varied by a small amount to trim out any offset that may be present in the sensor 20A. If the transducer interface circuit 10 is connected to a singled-ended sensor 20B having only a single sensor capacitor CS2, however, then the first capacitor array circuit CS1_INT will be set to equal the sense capacitor CS2 and the second capacitor array circuit CS2_INT will be zeroed. In the preferred embodiment, CS1_INT varies from 0–9.709 pF while CS2_INT only varies from 0–1.197 pF. One or the other will be used in a modest amount to trim a balanced pair sensor 20A, while the larger valued CS1_INT may be set near its full-scale end to provide a suitable dummy capacitance for use with a single-ended sensor 20B.

FIG. 5 shows that the preferred means 110 for configuring the capacitance of the capacitor array circuits CS1_INT, CS2_INT comprises control registers CS1_INT[8:0], CS2_INT[5:0].

The preferred embodiment is designed to accommodate a large range of sense capacitance (0.25–10 pF) by including programmable capacitor circuit arrays CS1_INT, CS2_INT. The arrays are variable with a resolution of 0.019 pF/bit and uniquely enable the transducer circuit 10 to reduce sense capacitor offsets and enable both single-ended and differential mode operation. The circuit 10, in fact, can operate single-ended over the entire 0.2–10 pF operating range. FIGS. 7 and 8 are abridged versions of the truth tables for the preferred capacitor circuit arrays are as follows:

The control registers CS1_INT[8:0], CS2_INT[5:0], like all of the control registers used in the circuit 10, may be loaded over a suitable interface (e.g. by shifting in values using a serial interface) or by storing the values in a ROM and then loading the values into the registers as needed. The preferred circuits provides a serial interface for testing and development and an internal EEPROM for storing final values.

Figure 6:
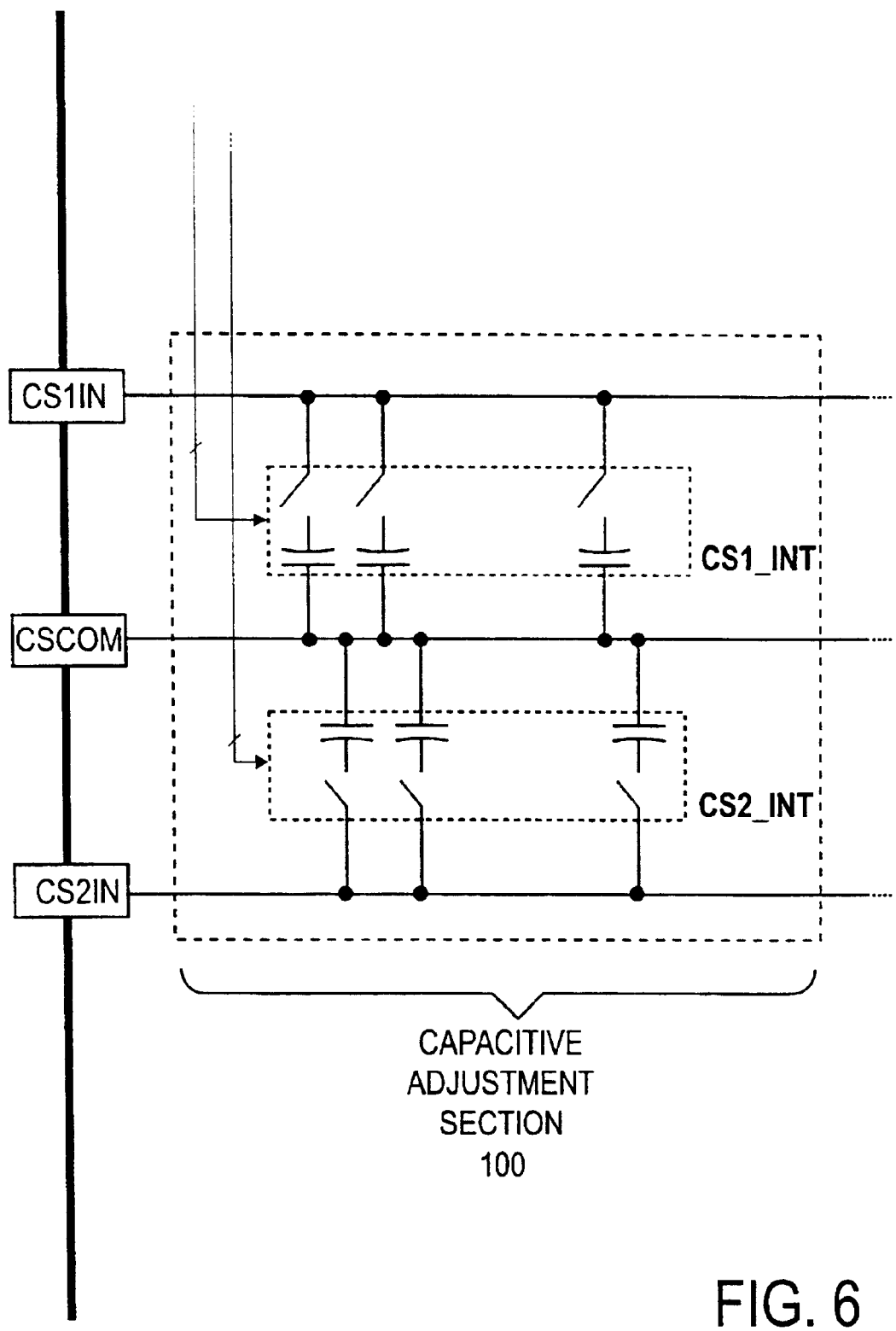
FIG. 6 is a schematic diagram of the first and second capacitor circuit arrays in the preferred transducer interface circuit 10.

FIG. 6 shows that the preferred capacitor array circuits CS1_INT, CS2_INT are comprised of parallel arrays of binary weighted capacitances that are switched in according to a suitable logic signals that are derived from the values stored in the control registers CS1_INT[8:0], CS2_INT [5:0]. Other circuit arrangements, of course, are possible.

Capacitive Trans-Impedance Amplifier Section 200

Returning to FIG. 5, one sees the construction of the preferred CTIA section 200. As shown, the CTIA 200 includes unique drive circuitry that is used to sense the capacitive values in the sensor, and the amplifier means 205 mentioned above with reference to FIG. 3.

In operation, the CTIA section 200 senses the difference in capacitance between the two capacitance values on either side of CSCOM then provides an output voltage that is proportional to the difference. In differential mode, the capacitors to be sensed are CS1 and CS2 (see FIG. 1). In single-ended mode, the capacitors to be sensed are CS1_INT and CS2 (see FIG. 2).

The preferred amplifier means 205, as described more fully below, is a differential amplifier circuit Al that has its non-inverting input referenced to 2.25V, and a feedback capacitance CF connected between its output and its inverting input. The value of the feedback capacitance CF determines the overall gain of the amplifier means 205 as more fully explained below. The preferred amplifier A1 has a folded cascade operational amplifier topology, but other known arrangements may be used Though not critical to the invention, the preferred amplifier A1 is provided with two bandwidths that are selectable with an "enable bandwidth" bit ENBW. When ENBW is low, the amplifier's open-loop gain is at a standard level. When ENBW is high, the amplifier's open-loop gain is increased by a factor of four and the closed-loop circuit is more responsive, but at the expense of power consumption. The selected bandwidth will largely be a function of power consumption requirements.

The CTIA section 200 measures the capacitance by uniquely oscillating a voltage around the two capacitances on either side of CSCOM. As a result, the capacitances are repeatedly charged and then discharged into one another to the extend they are of equal value. CS1T and CS2T are the total capacitances on either side of CSCOM. The values of CS1T and CS2T, of course, are a function of the CS1 and CS1_INT, and of CS2 and CS2_INT, i.e.

$$CS1T = CS1 + CS1\_INT$$

$$CS2T = CS2 + CS2\_INT$$

The preferred circuit operates with a single 5 volt supply and it contains an internal 2.25V precision voltage reference for use as a reference ground. The preferred CTIA section 200 includes an internal oscillator 220 that runs at 100 KHz. The oscillator 220 governs a timing circuit 230 that drives a pair of switches 231, 232 that are respectively connected to CS1IN and CS2IN and, thereby, to the capacitors that lead from those terminals to CSCOM. The oscillator 220, timing circuit 230, and switches 231, 232 operate to repeatedly oscillate CS1IN and CS2IN between 2.25V and 0V.

At the beginning of each cycle, CS2T is at 2.25V. When the applied polarity is reversed, CS1T charges rapidly to 2.25 v. Since q=CV, the charge q1 on CS1T is equal to CS1T*2.25. The charge q2 on CS2T is similarly equal to CS2T*2.25. If CS1T is larger than CS2T, than more charge will be in CS1T than in CS2T. Since the non-inverting input of the amplifier A1 in the amplifier means 205 has a very high impedance (theoretically infinite), the excess charge in CS1T will flow into or be "integrated" into the feedback capacitance CF and the output voltage will increase above 2.25V. Since V=C/q, a smaller CF results in a larger output voltage and a bigger CF results in smaller output voltage. A preset switch S1 is provided in the feedback path and controlled by the timing circuit 230. The preset switch S1 is used to discharge the feedback capacitance CF at the beginning of each cycle so that it is ready to sink any excess charge or source any deficiency as a measure of the capacitive difference. If CS1T is smaller than CS2T, then less charge will be in CS1T than in CS2T and current will flow from the feedback capacitance CF such that the output voltage drops below 2.25V.

Figure 9:
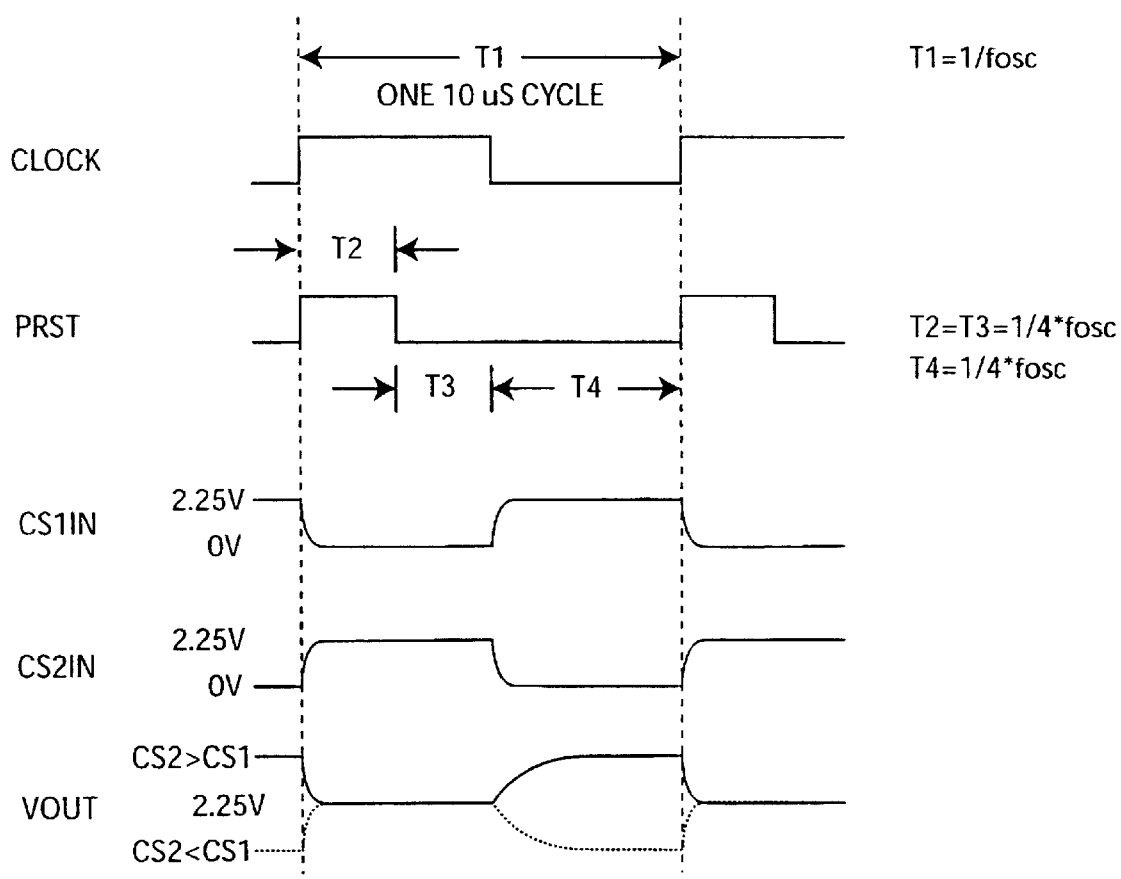
FIG. 9 is a timing diagram of the control signals that govern the operation of the preferred capacitive trans-impedance amplifier section of FIG. 5.

FIG. 9 is a timing diagram of the just-described capacitive sampling process. As shown, oscillator 220 and timing circuit 230 combine to produce a CLOCK with a period T1. At the beginning of each cycle, during quarter period T2, the preset PRST signal is asserted such that the preset switch S1 is closed and the feedback capacitance CF is fully discharged. In other words, the amplifier is auto-zeroed during PRST while CS2 is at 2.25V, or VREF. PRST then goes low, resulting in S1 opening for correlated double sampling. When the CLOCK goes low, the voltages on the capacitances CS1T, CS2T are reversed. Thereafter, when the voltage is transitioned in the middle of the cycle, the excess charge is transferred to or removed from the feedback capacitance CF, the ultimate voltage on CF being a function of its capacitance relative to the capacitive difference CS1T-CS2T. If CS1T=CS2T, then the output from amplifier A1 will not change from the reset value VREF. If CS1T is not equal to CS2T, however, then the amplifier means 205 will integrate charge across CF to provide the middle portion of the following relationship:

$$VOUT=GAIN*2.25V*[(CS2T-CS1T)/CF]+VREF$$

Figure 10:
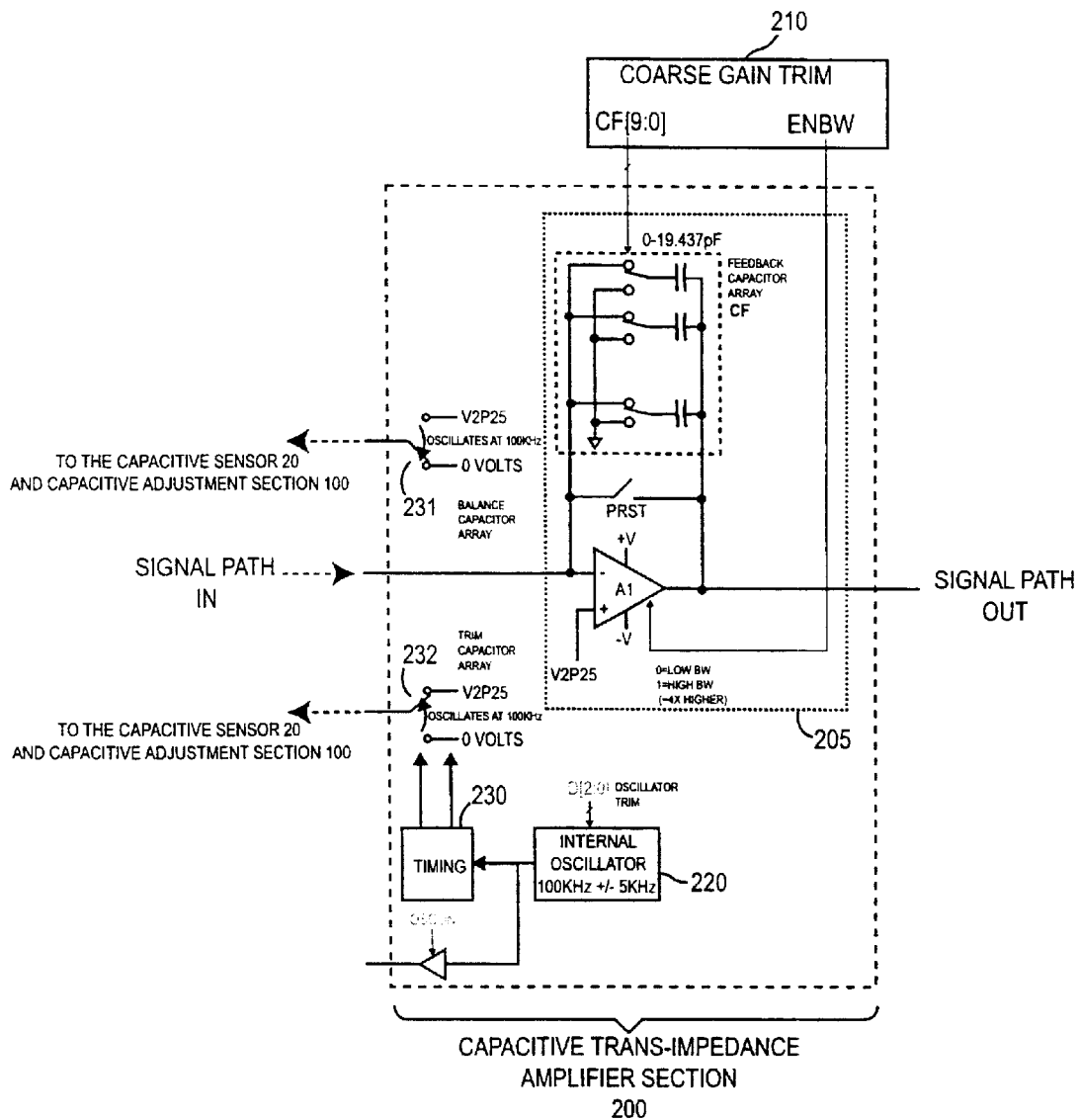
FIG. 10 is a schematic block diagram of the preferred capacitive trans-impedance amplifier section of FIG. 5, with additional details shown.

FIG. 10 is a schematic block diagram of the preferred capacitive trans-impedance amplifier section of FIG. 5, with additional details shown, that best illustrates the preferred circuitry for varying the feedback capacitance CF according to a value set in the means 210 for configuring the gain of the CTIA 200. As shown, the feedback capacitance CF is varied according to a feedback control register CF[9:0] by selectively connecting some on-chip capacitors to the inverting input of the amplifier A1, and by connecting other of the on-chip capacitors to the reference ground.

The preferred feedback capacitance circuit CF ranges from 0 to 19.437 pF and is controlled with 10 bits of programmability in 19 pF steps. The programmable configuration of the feedback capacitance permits the circuit 10 to be optimized for range and performance. An abridge truth table for the control fo the feedback capacitor circuit CF is as follows:

| CF9 | CF8 | CF7 | CF6 | CF5 | CF4 | CF3 | CF2 | CF1 | CF0 | Cap (pF) |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 1 | 0.019 |
| 0 | 0 | 0 | 0 | 0 | 0 | 0 | 0 | 1 | 0 | 0.038 |
| . | . | . | . | . | . | . | . | . | . | . |
| . | . | . | . | . | . | . | . | . | . | . |
| . | . | . | . | . | . | . | . | . | . | . |
| 1 | 0 | 0 | 0 | 0 | 0 | 0 | 0 | 0 | 0 | 9.728 |
| . | . | . | . | . | . | . | . | . | . | . |
| . | . | . | . | . | . | . | . | . | . | . |
| . | . | . | . | . | . | . | . | . | . | . |
| 1 | 1 | 1 | 1 | 1 | 1 | 1 | 1 | 1 | 1 | 19.437 |

As numerous other circuit arrangements and control ranges are possible, the preferred circuitry preferred values should not be regarded as a limitation on the broader aspects of the invention.

Low Pass Filter Section 300

The preferred circuit 10 provides a low pass filter section 300 in order to limit the signal and noise bandwidths. The preferred low pass filter section 300 is trimmable over the range of 100 Hz to 8 KHz, without requiring any external components.

Figure 11:
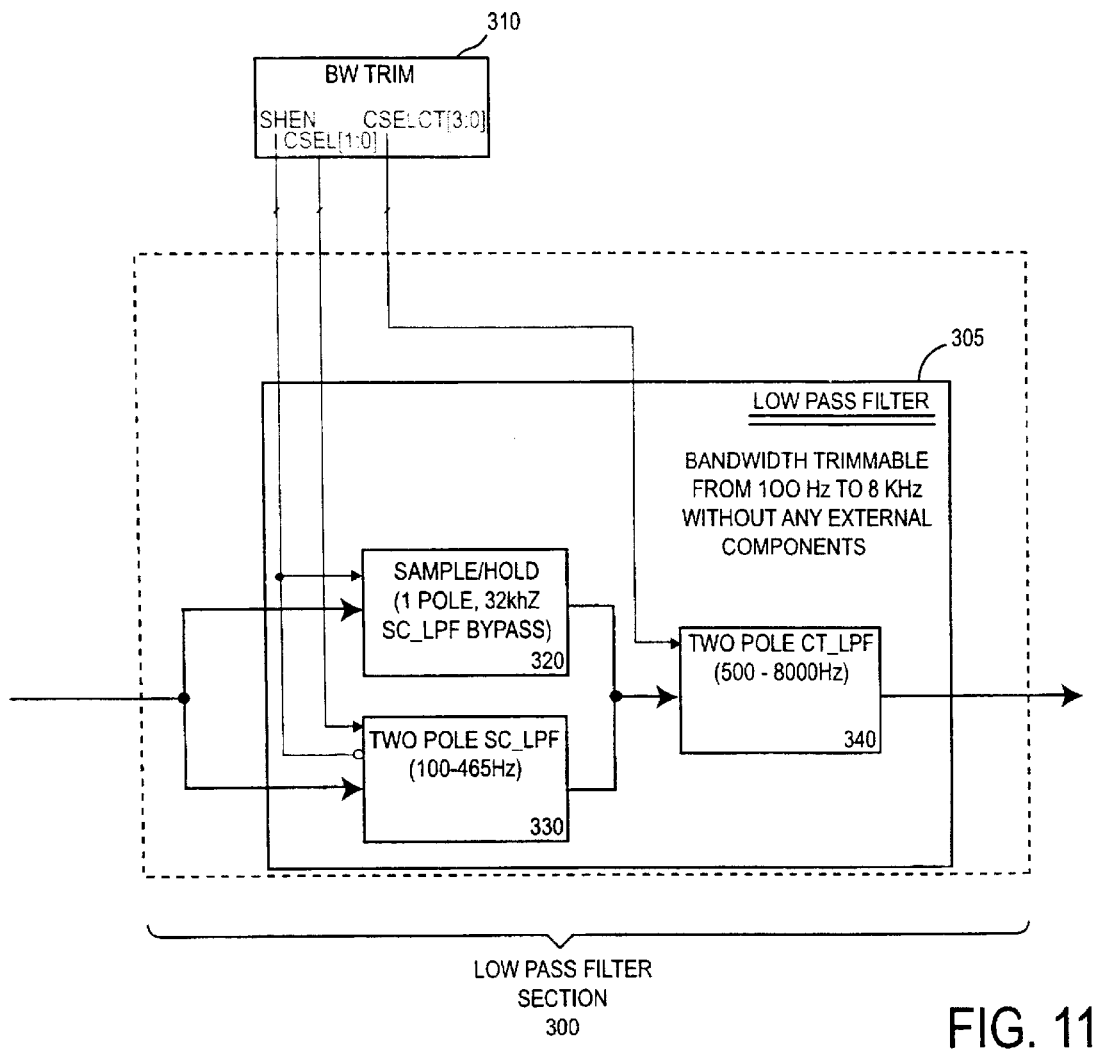
FIG. 11 is a schematic block diagram of the preferred low pass filter section of FIG. 5, with additional details shown.

As shown in FIG. 11, the input of the preferred low pass filter section 300 includes switched-capacitor circuits 320, 330 because the preferred CTIA section 200 is auto-zeroes every cycle. In the preferred embodiment, the switched-capacitor circuits 320, 330 share many common components as only one or the other is used at any one time. The output of the low pass filter section includes a two pole, continuous time LPF 340 that is trimmable over the range of 500–8000 Hz.

The first circuit 320 is a one pole, 32 KHz, switched-capacitor LPF that functions as a sample/hold circuit 320 when it is the continuous time LPF 340 that governs the bandwidth. The second circuit 330 is a two pole, 100–465 Hz, switched-capacitor LPF 330 that is used when the desired bandwidth is lower than can be accomplished with the CT-LPF 340. When used, the output of the lower frequency SC_LPF 330 is still passed through the CT_LPF 340 with the CT-LPF 340 set to its lowest bandwdith (500 Hz) in order to provide clock feed-through attenuation.

As with the capacitive adjustment section 100 and CTIA section 200, the low pass filter section 300 is characterized by programmable structures. In the preferred embodiment, the control registers provided are by a sample/hold enable bit SHEN, a first capacitance selection register CSEL[1:0], and a second capacitance selection register CSELCT[3:0].

SHEN is used to select between the lower and higher bandwidth range. In particular, when SHEN is low, the switched capacitor LPF 330 is enabled and operates to set the bandwidth between 100 and 465 Hz. On the other hand, when SHEN is high, the 32 KHz sample/hold circuit 320 is enabled in order to bypass the LPF functionality of the switched capacitor LPF 330 such that it is the CT_LPF 340 that is used to set the bandwidth between 500 Hz and 8 KHz.

The individual LPFs 330, 340 are trimmable to a desired bandwith within their respective ranges in accordance with the preferred embodiment of this invention. The first capacitance selection register CSEL[1:0] is used to set the 3 dB bandwidth of the switched-capacitor LPF 330 to one of four values v:

| CSEL1 | CSEL0 | Bandwidth (Hz) |
|---|---|---|
| 0 | 0 | 465 |
| 0 | 1 | 350 |
| 1 | 0 | 200 |
| 1 | 1 | 100 |

The second capacitance selection register CSELCT[3:0], on the other hand, is used to set the 3 dB bandwidth of the continuous-time LPF 340 to one of nine states (11001–11111 are unused states) as shown by the following truth table:

| CSELCT3 | CSELCT2 | CSELCT1 | CSELCT0 | BANDWIDTH (HZ) |
|---|---|---|---|---|
| 0 | 0 | 0 | 0 | 8000 |
| 0 | 0 | 0 | 1 | 5800 |
| 0 | 0 | 1 | 0 | 4200 |

-continued

| CSELCT3 | CSELCT2 | CSELCT1 | CSELCT0 | BANDWIDTH (HZ) |
|---------|---------|---------|---------|----------------|
| 0 | 0 | 1 | 1 | 3000 |
| 0 | 1 | 0 | 0 | 2000 |
| 0 | 1 | 0 | 1 | 1400 |
| 0 | 1 | 1 | 0 | 1000 |
| 0 | 1 | 1 | 1 | 800 |
| 1 | 0 | 0 | 0 | 500 |

Output Buffer Section 400

Returning again to FIG. 5, one sees that the preferred transducer interface circuit 10 further includes an output buffer section 400 that provides a desired output impedance and even more adjustability with regard to gain and offset. The preferred output buffer section 400 includes an inverting voltage amplifier that is implemented with an operational amplifier A2 that is based on a constant-$g_m$ rail-to-rail input stage. It includes three programmable features: (1) signal path gain; (2) voltage reference level control; and (3) fine VDC offset trim.

Figure 12:
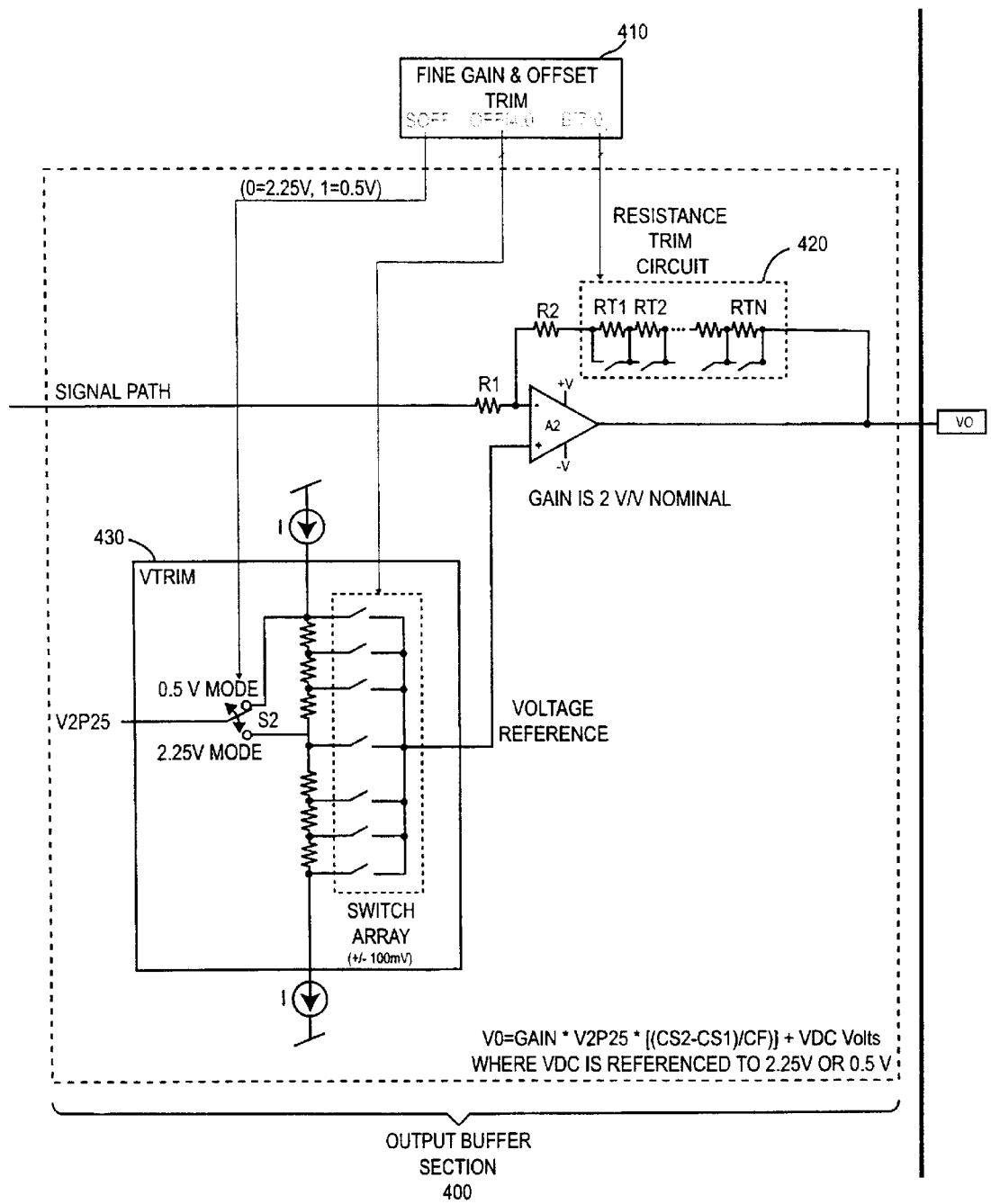
FIG. 12 is a schematic block diagram of the preferred output buffer section 400 of FIG. 5, with additional details shown.

FIG. 12 is a schematic block diagram of the output buffer section 400 that is similar to that shown in FIG. 5, but with additional detail.

As shown in FIG. 12, the signal path gain is set by controlling the value of a resistor resistance trim circuit 420 such that the total feedback resistance R2+RT varies relative to an input resistance R1. The nominal signal path gain is set to 2V/V based on R2/R1 where R2 is 2*R1. The nominal gain of 2V/V, however, may be trimmed in the range of +/−0.3V/V (+/−15%) in 0.0024V/V steps by using a resistive circuit control register B[7:0] as suggested by the following abridged truth table:

| B7 | B6 | B5 | B4 | B3 | B2 | B1 | B0 | Gain Trim |
|----|----|----|----|----|----|----|----|-----------|
| 0 | 0 | 0 | 0 | 0 | 0 | 0 | 0 | −15% |
| 1 | 0 | 0 | 0 | 0 | 0 | 0 | 0 | Nominal |
| 1 | 1 | 1 | 1 | 1 | 1 | 1 | 1 | +15% |

The DC offset voltage and find offset trim are adjusted within a voltage trim circuit 430 that includes a switch S2 and a resistor string 431. The voltage trim circuit 430 operates with a precision voltage reference V2P25, and a current source I that may each be implemented in a known manner.

As to the DC offset, the amplifier A2's voltage reference may be uniquely set to two different set points in order to optimally accommodate a differential sensor 20A and a single-ended sensor 20B. A sensor offset bit SOFF is used to select between a 2.25V set point and a 0.5V set point. A 2.25V set point is selected for use with a balanced-pair sensor 20A so that the output voltage VO ranges between 0.5V and 4.5V, on either side of a 2.25V center. On the other hand, a 0.5V set point is selected for use with a single-ended sensor 20B so that the resulting singled-ended output voltage VO ranges from 0.5V to 4.5V with near-maximal resolution.

The fine VDC offset trim is adjusted by finely varying the voltage reference provided to the amplifiers non-inverting input. This is a desirable feature because there may still be some small amount of DC offset even after the coarse offset trim was accomplished by using one of the internal capacitor circuits CS1_INT, CS2_INT to coarsely trim away a mismatch between a balanced-pair of external sense capacitances CS1, CS2, or by making the internal capacitor circuit CS1_INT coarsely equal to a single-ended external sense capacitance CS2, as described above. The fine trim for DC offset for the output buffer section 400 ranges +/−100 mV in 6.25 mV steps. An abridged version of the truth table is as follows:

| OFF4 | OFF3 | OFF2 | OFF1 | OFF0 | OFFSET TRIM |
|------|------|------|------|------|-------------|
| 0 | 0 | 0 | 0 | 0 | −100 mV |
| 1 | 0 | 0 | 0 | 0 | Nominal |
| 1 | 1 | 1 | 1 | 1 | +100 mV |

Programming Structure

The preferred configuring means 110, 210, 310, 410, disclosed thus far as comprising various registers, are further comprised of on-chip EEPROM that sends the user's desired data to the on-chip registers CS1_[8:0], CS2_[5:0}, and so on. In the preferred circuit, the user has the option of storing the configuration values in the EEPROM (not shown) or of loading the control registers directly using a serial input. The latter feature is useful during test and development stages of a particular application of the capacitive transducer interface circuit, the EEPROM being used to store the final values in a more lasting manner.

From the foregoing description, it will be apparent that the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. A capacitive transducer interface circuit that produces an output value that is proportional to a change in capacitance of a sense capacitor in a capacitive transducer comprising:
   an integrated circuit having:
      (1) a capacitive adjustment section that is electrically connected to the sense capacitor, including:
         (a) a capacitor array circuit;
         (b) means for configuring the capacitance of the capacitor array circuit and for combining the capacitance of the capacitor array circuit with the capacitance of the sense capacitor to provide a substantially null value when the capacitive transducer is in a null position; and
      (2) a capacitive trans-impedance amplifier section that is electrically connected to the sense capacitor and the capacitive adjustment section, including:
         (a) a trans-impedance amplifier means for producing an output signal that is proportional to the change in capacitance of the sense capacitor; and
         (b) means for configuring the gain of the capacitive trans-impedance amplifier to provide a desired dynamic range.

2. The capacitive transducer interface circuit of claim 1 wherein the means for configuring the capacitance comprises:
   a register that stores a capacitance configuration value; and means for modifying the capacitance of the capacitor array circuit in accordance with the capacitance configuration value.

3. The capacitive transducer interface circuit of claim 2 wherein the capacitor array circuit is a binary weighted array of parallel capacitors.

4. The capacitive transducer interface circuit of claim 1 wherein the capacitive trans-impedance amplifier comprises:

an amplifier circuit having an inverting input, a non-inverting input, and an output;

wherein the gain of the capacitive trans-impedance amplifier is determined by a feedback capacitance connected between the output and the non-inverting input.

5. The capacitive transducer interface circuit of claim 4 wherein the means for configuring the gain of the capacitive trans-impedance amplifier comprises:

a register that stores a gain configuration value; and means for modifying the feedback capacitance in accordance with the configuration value.

6. The capacitive transducer interface circuit of claim 1 further comprising:

a low pass filter section that modifies the output signal in accordance with a characteristic bandwidth; and means for configuring the characteristic bandwidth of the low pass filter section.

7. The capacitive transducer interface circuit of claim 6 further comprising:

an output buffer section that provides a desired output impedance, including:
an amplifier circuit that provides additional gain and a desired DC offset;
means for configuring the additional gain; and
means for configuring the desired DC offset.

8. The capacitive transducer interface circuit of claim 1 wherein the capacitive adjustment section is configurable to operate with:

(1) a differential-type capacitive transducer that is defined by a common plate and a pair of outer plates to provide a balanced-pair of first and second sense capacitors that are connected in series to provide an upper sensor terminal, a lower sensor terminal, and a common sensor terminal; or (2) a singled ended-type capacitive transducer that is defined by one pair of plates to provide a single sense capacitor having first and second sensor terminals.

9. The capacitive transducer interface circuit of claim 8 wherein the capacitor array circuit is a first capacitor array circuit, wherein the means for configuring the capacitance of the first capacitor array circuit is a first means for configuring; and wherein the capacitive adjustment section further comprises:

a second capacitor array circuit; and a second means for configuring the capacitance of the second capacitor array circuit, the second capacitor array circuit being connected in series with the first capacitor array circuit to provide an upper capacitive array terminal, a lower capacitive array terminal, and a common capacitive array terminal.

10. The capacitive transducer interface circuit of claim 9 wherein the capacitive adjustment section is configured to operate with the differential-type capacitive transducer by connecting the upper sensor terminal, the lower sensor terminal, and the common sensor terminal to the upper capacitive array terminal, the lower capacitive array terminal, and the common capacitive array terminal, respectively, to form a capacitive divider circuit with the first sense capacitor and the first capacitive array circuit in parallel with one another in a top portion thereof and the second sense capacitor and the second capacitive array circuit in parallel with one another in a bottom portion thereof.

11. The capacitive transducer interface circuit of claim 9 wherein the capacitive adjustment section is configured to operate with the singled ended-type capacitive transducer by connecting the first sensor terminal to the common capacitive array terminal and connecting the second sensor terminal to the lower capacitive array terminal to form a capacitive divider circuit with the first capacitive array circuit in a top portion thereof and the single sense capacitor and the second capacitive array circuit in parallel with one another in a bottom portion thereof.

12. A capacitive transducer interface circuit that produces an output value that is proportional to a difference in capacitance between first and second capacitors that are connected together at a common terminal, comprising:

(a) a trans-impedance amplifier means for producing an output signal that is proportional to the difference in capacitance between the first and second capacitors, said trans-impedance amplifier means including an operational amplifier having an inverting input, a non-inverting input, and an output, with the inverting input connected to the common terminal, with the non-inverting input connected to a reference ground, and with a feedback capacitance connected between the output and the non-inverting input;

(b) a means for repeatedly (1) discharging the feedback capacitance, (2) applying a voltage difference across the first capacitors to charge the first capacitor while applying an equal potential voltage across the second capacitor to discharge the second capacitor; and (3) then reversing the voltages applied to the first and second capacitors such that the first capacitor discharges into the second capacitor and integrates charge into or out of the feedback capacitance to the extent there is any difference in capacitance between the first and second capacitors.

* * * * *